(12) United States Patent
Borbe et al.

(10) Patent No.: US 7,571,666 B2
(45) Date of Patent: Aug. 11, 2009

(54) GEAR CASE OF A SEAT ADJUSTING DRIVE FOR A MOTOR VEHICLE

(75) Inventors: Michael Borbe, Rheinbach (DE); Stefan Wetzig, Ennepetal (DE); Wolfram Hofschulte, Bonndorf (DE); Michael Wöhrle, Niedereschach (DE)

(73) Assignees: KEIPER GmbH & Co. KG, Kaiserslautern (DE); IMS Gear GmbH, Eisenbach (DE)

( * ) Notice: Subject to any disclaimer, the term of this patent is extended or adjusted under 35 U.S.C. 154(b) by 0 days.

(21) Appl. No.: 11/448,493

(22) Filed: Jun. 7, 2006

(65) Prior Publication Data
US 2006/0278037 A1 Dec. 14, 2006

Related U.S. Application Data

(63) Continuation of application No. PCT/EP2004/013628, filed on Dec. 1, 2004.

(30) Foreign Application Priority Data
Dec. 8, 2003 (DE) .............................. 103 58 586

(51) Int. Cl.
*F16H 57/04* (2006.01)
*F16H 61/00* (2006.01)
*F16H 29/20* (2006.01)
*A47C 1/00* (2006.01)
*F16H 1/12* (2006.01)

(52) U.S. Cl. ..................... 74/606 R; 74/425; 74/89.1; 74/89.14; 74/416; 297/344.1

(58) Field of Classification Search ............... 74/606 R, 74/425, 89.14, 416; 297/344.1–344.2; 438/158; D15/148; 29/893.1
See application file for complete search history.

(56) References Cited

U.S. PATENT DOCUMENTS 3,319,482 A * 5/1967 Campbell et al. ............. 74/425
4,721,337 A    1/1988 Tomita
4,930,367 A * 6/1990 Nagasawa .................... 74/416

(Continued)

FOREIGN PATENT DOCUMENTS

DE           31 07 455 A1    10/1982

(Continued)

*Primary Examiner*—Vinh T. Luong
(74) *Attorney, Agent, or Firm*—Womble Carlyle Sandridge & Rice, PLLC

(57) ABSTRACT

Case parts of an adjustment mechanism for a seat adjustment device of a motor vehicle can be joined together along a parting line via joint surfaces. The joint surfaces are provided for the purpose of reciprocal placement of the case parts by way of a joining process. Contact surfaces of the case parts are present in addition to the joint surfaces The contact surfaces are in non-parallel alignment to the joint surfaces. Transferred gear forces running parallel to at least a section of the joint surfaces are absorbed by the contact surfaces. The case parts are fastened to one another by way of screw connections. The contact surfaces of the one case part are respectively held in position with respect to the contact surfaces of the other case part solely due to the screw connections. With such a case, high loads can be absorbed in spite of a small size.

3 Claims, 3 Drawing Sheets

U.S. PATENT DOCUMENTS

| | | | |
|---|---|---|---|
| 5,598,746 A * | 2/1997 | Chen | 74/606 R |
| 5,865,506 A * | 2/1999 | Sakamoto | 297/362.14 |
| 6,032,550 A * | 3/2000 | Rugh | 74/425 |
| D437,334 S * | 2/2001 | Song | D15/148 |
| 6,548,332 B2 * | 4/2003 | Peng et al. | 438/158 |
| 6,742,409 B2 * | 6/2004 | Blanchard | 74/425 |
| 7,437,962 B2 * | 10/2008 | Taubmann et al. | 74/89.1 |
| 2005/0082890 A1 | 4/2005 | Taubmann et al. | |
| 2005/0126333 A1 | 6/2005 | Dohles et al. | |

FOREIGN PATENT DOCUMENTS

| | | |
|---|---|---|
| DE | 102 50 994 A1 | 8/2003 |
| EP | 0 848 672 B1 | 6/1998 |
| EP | 0 992 711 A2 | 4/2000 |
| EP | 1 026 027 B1 | 8/2000 |
| EP | 1 068 093 B1 | 1/2001 |
| JP | 62-184939 | 8/1987 |
| WO | WO 97/09192 A1 | 3/1997 |
| WO | WO 03/074209 A2 | 9/2003 |

* cited by examiner

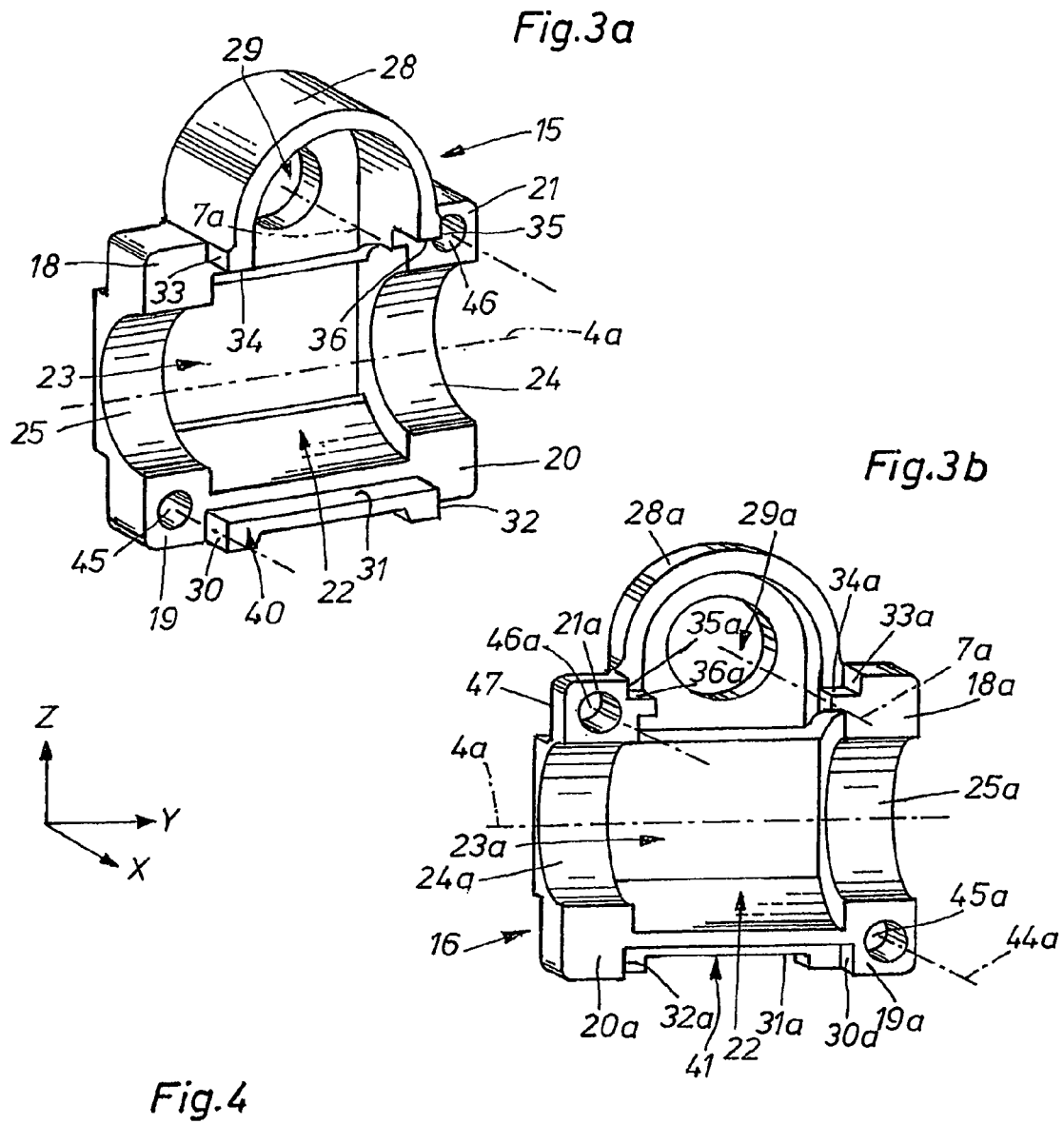

GEAR CASE OF A SEAT ADJUSTING DRIVE FOR A MOTOR VEHICLE

CROSS-REFERENCE TO RELATED APPLICATION

The present application is a continuation of International Application PCT/EP2004/013628, which was filed Dec. 1, 2004. The entire disclosure of PCT/EP2004/013628 is incorporated herein by reference.

BACKGROUND OF THE INVENTION

The present invention relates to a gear case of an adjustment mechanism for a seat adjustment device of a motor vehicle, with the gear case being provided for the holding of mechanism elements of the adjustment mechanism, and the gear case being equipped with at least two case parts, wherein the case parts define two recesses for passage of a spindle of the adjustment mechanism, and the case parts can be joined together along a parting line to form the case, whereby at least two case parts in the region of the parting line of the case are provided with joint surfaces that are respectively cooperative when the case parts are joined together along the parting line. The invention also relates to an adjustment mechanism that includes such a gear case.

EP 1 068 093 B1 describes a gear case like that described immediately above. The gear case of EP 1 068 093 B1 holds a gear that is provided especially for a longitudinal seat adjuster. Such longitudinal seat adjusters serve the purpose of adjusting a motor vehicle seat in a longitudinal direction with respect to a floor structure of a vehicle. The adjustment is brought about by means of longitudinally moving an upper rail, on which the seat is located, with respect to an opposite lower rail. The gear case is attached to the upper rail, whereas the lower rail is fastened to the vehicle. With the gear, a rotary driving movement of an electric motor is transformed into the longitudinal adjustment movement.

With such gear cases, the absorbing of gear forces and also crash loads can cause problems. In order to make this possible with the simplest possible constructive design of the gear case, the gears would actually have to be quite massive in design. On the other hand, however, it is also desirable to integrate the gear cases between the upper and lower rails. For this reason there is a tendency to keep the size of the gear cases as small as possible. Consequently there is a conflict of goals with regard to the demands placed on a gear case.

With regard to the controllability of the gear forces and crash loads, the connection of the case parts is of particular relevance. In this connection, it is relatively easy to control pure compression forces, with which the case parts (typically two case parts) essentially press against one another. These forces can themselves be absorbed by means of the case parts, namely by means of surface pressure in the region of joint surfaces of the case parts. In this regard, the joint surfaces are the surfaces of the case parts that come into contact with each other due to the joining of the case parts at the joint. However, all other forces occurring in the region of the parting line of the case subject above all the connection of the case parts to the load. For this reason, in the state of the art, either comparatively massive or technically expensive connections are employed.

In EP 1 068 093 B1, which has already been named, plug and socket connections are to be provided for the solution of this problem, whereby by means of plastic deforming or for example a welding of the plug and socket connection a permanent and actually load bearing connection is generated between the case plates. However, in this connection the fact that for generation of the permanent connection cost-intensive equipment, such as for example laser welding equipment, is required can be perceived as a disadvantage. In addition, the possibility that the thermal energy used and/or the mechanical action on the plug and socket connections will damage gear elements cannot be ruled out.

BRIEF SUMMARY OF SOME ASPECTS OF THE INVENTION

The present invention is based on the object of providing a case for an adjustment mechanism of the type described above, wherein the case can absorb high loads, the case's parts are securely fixed to one another, and, in spite of this, the case can be small. In addition, the solution is designed to be reasonably favorable with respect to production and installation.

In accordance with one aspect of the present invention, a gear case includes contact surfaces that are present in addition to the joint surfaces on the case parts. The contact surfaces are in non-parallel alignment to the joint surfaces. Transferred gear forces, whose direction of flow runs parallel to at least a section of the joint surfaces, are absorbed via the contact surfaces. The case parts are fastened to one another by means of screw connections, so that the contact surfaces of the one case part are respectively held in place with respect to the contact surfaces of the other case part solely due to the screw connections. The gear case can be part of an adjustment mechanism, and more specifically part of a longitudinal adjuster.

The invention is consequently based among other things on the idea of using screw connections to absorb a portion of the forces occurring in the case. The screw connections should above all absorb those forces that run in a first direction, with the first direction being parallel to the longitudinal direction of the provided screws.

In accordance with the invention, however, additional measures are provided for diminishing at least some of the forces which have a component that runs at a right angle to the longitudinal direction of at least one of the screw connections. This measure can be realized by means of the contact surfaces of the case parts. In this regard, each of the at least two contact surfaces are directly facing each other in assembled state of the gear case, and they extend at least substantially parallel to one another. The contact surfaces provided for reciprocal surface pressure are held in place with respect to one another solely by means of the screw connections.

The contact surfaces of the case parts can be touching each other in the no-load condition of the case, so that forces can be diminished by means of a surface pressure of the contact surfaces. Alternatively, the case parts can be designed in such a way that the contact surfaces do not come into contact with each other until there is a loading of the case parts, so that the contact surfaces act in a load diminishing manner. In contrast to the state of the art, as given by EP 1 068 093 B1, there are no contact-intensive, permanent connections necessary between the case parts for load diminishing, in order to be able to absorb high gear forces with the case. Nevertheless, tractive forces can be achieved with the invention, which are superior to any tractive forces that are attainable with welded joints.

Any case part can be provided with several contact surfaces with advantage, whereby two contact surfaces of differing case parts each form one contact surface pair. By means of orienting of the at least two contact surface pairs in different directions in space which deviate from the orientation of the joint surfaces it is possible—upon consideration of the screw connections—to absorb forces in a total of three different directions in space. In this regard, an especially favorable inventive design can be provided by having the forces controllable by means of the contact surfaces and the screw connections forming a Cartesian coordinate system with x, y and z axes. With such an inventive design it is possible to absorb all gear forces acting as shearing forces along the course of the parting line of the case via the contact surfaces.

In order to connect components such as the case parts to each other by means of screw connections, a pre-adjustment of the components is usually necessary before the screws can be screwed in. The achievement of such an alignment of the components requires very precisely machined and expensively designed sockets for the components. With regard to the present invention, such sockets can be particularly simple in construction and inexpensive, since the contact surfaces provided for load diminishing can also assume at least a part of the function of the reciprocal alignment of the case parts.

With regard to the screw connections, the use of self-grooving or self-tapping screws has proven to be especially favorable. Since the separate cutting of threads can be avoided by so doing, an especially efficient production and assembly of the gear case results.

Aside from being used as a longitudinal seat adjuster, the invention can also be used in connection with seat height adjusters or seat inclination adjusters.

Other aspects, embodiments and advantageous of the invention will become apparent from the following.

BRIEF DESCRIPTION OF THE DRAWINGS

The invention is explained in greater detail below with reference to exemplary embodiments which are illustrated in the schematic drawings, in which:

FIG. 3a shows a first case part in a perspective representation;

FIG. 3b shows a second case part in a perspective representation; and

FIG. 4 shows an additional inventive gear case in an assembled state.

DETAILED DESCRIPTION OF EXEMPLARY EMBODIMENTS

Figure 1:
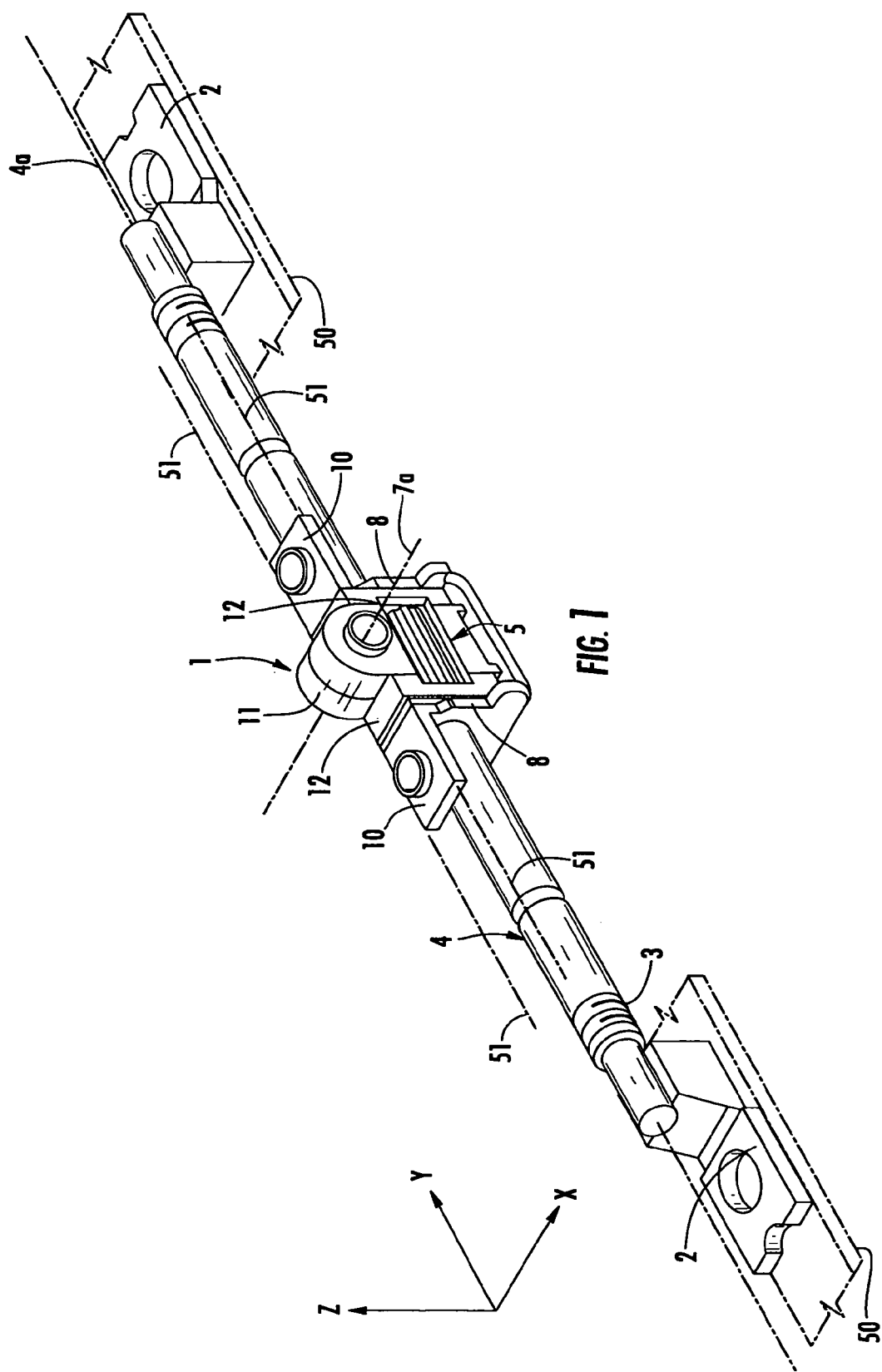
FIG. 1 shows a perspective representation of an inventive gear.
Figure 2:
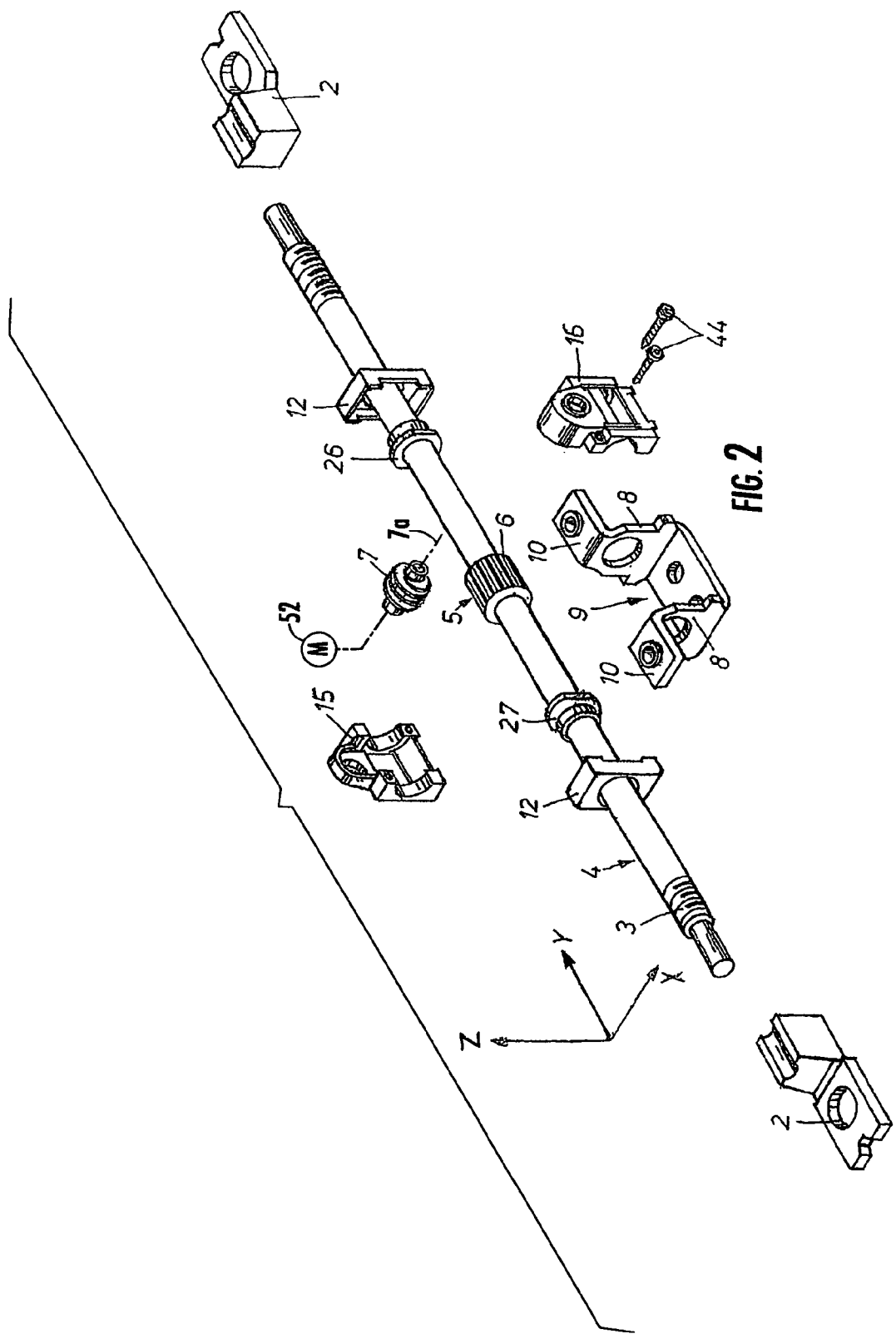
FIG. 2 shows the gear of FIG. 1 in an exploded configuration.

The inventive gear 1 shown in FIG. 1 and FIG. 2 is provided for longitudinal seat adjustment of a motor vehicle seat. It is located preferably between a bottom rail and a top rail and is the component of a longitudinal adjuster. In this context, the bottom rail is fastened to the floor of a motor vehicle, whereas the top rail is fastened to the seat and can be longitudinally adjusted with the seat relative to the bottom rail. The two rails can be movably connected to each other via a sleeve bearing or via roller bearings. This basic structure of a longitudinal adjuster is known/not novel per se and, therefore, not described in greater detail and only schematically illustrated in the figures, namely portions of the bottom rail 50 are schematically illustrated by dashed lines in FIG. 1, portions of the top rail 51 are schematically illustrated by dashed lines in FIG. 1, and a drive motor 52 is schematically shown in FIG. 2.

The two spindle holders 2 are fastened to the bottom rail 50. A spindle 4, which is provided with a thread 3, is fixedly held in a non-rotational manner by both spindle holders 2. A threaded nut 5 is arranged on the spindle. The threaded nut defines a spiral gearing 6 on its surface. The spiral gearing 6 meshes with a worm gear 7. In this arrangement, a longitudinal axis 4a of the spindle 4 and a rotational axis 7a of the worm gear 7 run perpendicular to each other. The worm gear 7 is rotationally driven by the drive motor 52. A manual controller could be provided in place of the drive motor 52.

The spindle 4 fits through two sides 8 of an essentially U-shaped holding clip 9. The flange-like sides 8 of the holding clip 9 are parallel to one another. A fastening side 10 is connected to each of the sides 8. The holding clip 9 is mounted to the top rail 50 by way of the fastening sides 10. The fastening sides 10 are bent by about 90° compared to their respective sides 8.

A gear case 11, along with two pads 12 that boarder the gear case 11, are held in the U-shaped holding clip 9. In this regard, the pads 12 are respectively located between the gear case 11 and the sides 8. By means of the pads 12, the transfer of potential oscillations of the gear to the top rail 50 is prevented and hence a disturbing noise development is also suppressed.

The gear case 11 of the exemplary embodiment consists of only two generally saucer-type case parts 15, 16, shown in greater detail in FIGS. 3a and 3b, namely a case cover and a case foundation. The longitudinal axis 4a of the spindle 4 lies in a parting plane of the case. At this parting plane, the two case parts 15, 16 adjoin with joint surfaces 18, 19, 20, 21; 18a, 19a, 20a, 21a. The rotational axis 7a of the worm gear 7 extends perpendicular to the parting plane.

The two case parts form a receiving space 22 between them. Arranged within a section of the receiving space 22 are the spindle 4, the spindle nut 5, the worm gear 7, and four bearing bushings (also see FIG. 2). Since the receiving space 22 has a smaller width than the diameter of the spindle nut 5, each of the case parts 15, 16 has an opening 23, 23a in the region of its lateral walls. In addition, the case parts have two opposing semicircular notches 24, 25; 24a, 25a in the region of the parting plane. The semicircular notches 24, 25; 24a, 25a are paired to respectively form recesses through which the spindle 4 is guided. Each of the recesses has a bearing bushing 26, 27 arranged in it. The spindle 4 is supported in the bearing bushings 26, 27 (FIG. 2).

As can be inferred from the two illustrations of FIG. 3a and FIG. 3b, there are also recesses 29, 29a present in the top semicircular extensions 28, 28a of the case parts 15, 16. These recesses 29, 29a are used to receive the worm gear 7, which can be supported in the case parts 15, 16 by means of bearing bushings.

In the assembled state, the plane joint surfaces 18-21, 18a-21a of the case parts 15, 16 are respectively pressed against one another in the region of the parting plane. In the region of the receiving space 22, the case parts 15, 16 have several contact surfaces. In this regard, a first type of contact surfaces 31, 31a, 34, 34a, 36, 36a (e.g., a first plurality of contact surfaces) runs parallel to the X-Y plane and hence also runs parallel to the longitudinal axis 4a of the spindle. On the other hand, a second type of contact surfaces 30, 30a, 32, 32a, 33, 33a, 35, 35a (e.g., a second plurality of contact surfaces) is parallel to the X-Z plane and hence is perpendicular to contact surfaces 31, 31a, 34, 34a, 36, 36a of the first type. Both types of contact surfaces are in addition perpendicular to the joint surfaces 18-21, 18a-21a, with the joint surfaces being parallel to the Y-Z plane. Each of the contact surfaces of one of the case parts 15, 16 has a counterpart on the respective other case part 15, 16. When the case parts 15, 16 are assembled together there are consequently several pairs of contact surfaces 30, 30a; 31, 31a; 32, 32a; 33, 33a; 34, 34a; 35, 35a; 36, 36a of both case parts that are formed, which run parallel to one another and are directly opposite one another.

As can be recognized in particular in FIG. 3a, some of the contact surfaces are formed at a somewhat board-shaped lower extension 40 of the case part 15. This extension 40 includes the two plane contact surfaces 30, 32, which run parallel to the X-Z plane, as well as contact surface 31, which is in parallel alignment to the X-Y plane. On the other case part 16, the matching and parallel contact surfaces 30a, 31a, 32a are provided in an undercut 41 (e.g., a receptacle).

On the other side of the longitudinal axis 4a of the spindle in the region of the semicircular extensions 28, 28a of the two case parts 15, 16 there are more of the contact surfaces constructed in pairs. Here, too, at both case parts there are first contact surfaces 33, 35; 33a, 35a in parallel alignment to the X-Z plane, and second contact surfaces 34, 36; 34a, 36a in parallel alignment to the X-Y plane. Here, also, contact surfaces 33, 33a; 34, 34a; 35, 35a; 36, 36a each form contact surface pairs.

The contact surfaces in their totality form a kind of interlocking of projections and undercuts. As a result of the interlocking, for one thing the relative location of the two case parts 15, 16 to each other with regard to their reciprocal alignment or location in the Y-Z plane (plane of the joint surfaces) is predetermined. Additionally, in the assembled state of the gear case 11, forces or components of forces, which are respectively directed normal to the contact surfaces, are respectively absorbed via the interlocking contact surfaces. As a result of the fact that contact surface pairs are present on both sides of the longitudinal axis 4a of the spindle, it is also possible to absorb moments acting on the case around the longitudinal axis 4a as well as around the rotational axis 7a.

In order to connect the two case parts 15, 16 to each other there are two screw connections provided which are diagonally opposite to each other with reference to the receiving space 22. In other embodiments there can be a single or also three or more screw connections present, as for example is shown in FIG. 4. Regardless of the number of screw connections, however, all screws that are provided should be in parallel alignment to each other.

In the embodiment of FIGS. 1, 2, 3a, 3b each of the screw connections has a self-grooving, socket-head cap screw 44 2.5×8 M in size. Such socket-head cap screws can, in comparison to conventional screws, in particular in comparison to the otherwise common countersunk head screws, absorb higher torques without damage. The longitudinal axes 44a of the screws 44 run parallel to each other and parallel to the rotational axis 7a of the worm, i.e. parallel to the X-direction and therewith at a right angle to the driving direction of a motor vehicle.

The screws 44 each fit through a through recess 45a, 46a of the case part 16 and are screwed into a recess 45, 46 of the other case part 15. During the assembly, the screws form the internal screw threads in case part 15. With only the two screw connections it is already possible to achieve tractive forces in the direction of the screw longitudinal axes of 1500 N and significantly more.

To ensure that the case together with its screw connections assembles as compactly as possible, flat surfaces 47 are provided in the corner regions of the case part 16, on which the screw heads come to rest. This can prevent the screw heads from projecting above the outer border of the case part 16. On the other hand, as a result of this a nearly symmetrical design of the case is achieved with reference to the X-Z plane. This makes it possible to use identically shaped pads on both sides of the case, which keeps the tooling costs and thus the production costs of the gear low.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A gear case for receiving gear forces from at least one gear of an adjustment mechanism of a vehicle seat, wherein the at least one gear includes a spindle, the gear case comprising:
   case parts joined to one another along a parting line to form the gear case, wherein
   the gear case defines openings that are for having the spindle extend therethrough;
   the case parts are fastened to one another by one or more screw connections;
   each of the case parts includes joint surfaces;
   the joint surfaces are respectively held together by the one or more screw connections;
   each of the case parts further includes contact surfaces that are not parallel to the joint surfaces;
   the contact surfaces of one of the case parts are respectively held in position with respect to the contact surfaces of the other of the case parts
   (a) solely due to the one or more screw connections, and
   (b) so that the contact surfaces are respectively cooperative with one another for absorbing, by way of respective contact between the contact surfaces, at least some of the gear forces that are directed parallel to at least a portion of the joint surfaces;
   the contact surfaces includes a first plurality of contact surfaces that are not parallel to the joint surfaces;
   the contact surfaces further includes a second plurality of contact surfaces that are not parallel to the joint surfaces;
   the first plurality of contact surfaces are not parallel to the second plurality of contact surfaces;
   the case parts includes a first case part and a second case part;
   the first case part includes an extension;
   the extension includes a contact surface of the first plurality of contact surfaces;
   the extension includes a contact surface of the second plurality of contact surfaces;
   the second case part includes a receptacle for receiving the extension;
   the receptacle includes a contact surface of the first plurality of contact surfaces; and
   the receptacle includes a contact surface of the second plurality of contact surfaces.

2. The gear case in accordance with claim 1, wherein:
   the first plurality of contact surfaces are perpendicular to the joint surfaces;
   the second plurality of contact surfaces are perpendicular to the joint surfaces; and
   the first plurality of contact surfaces are perpendicular to the second plurality of contact surfaces.

3. The gear case of claim 1 in combination with:
   the spindle, wherein the spindle extends through the openings so that the spindle extends through the gear case;
   a lower rail for mounting proximate a floor of a motor vehicle;
   an upper rail mounted on the lower rail for being longitudinally moved relative to the lower rail;
   a threaded nut arranged on the spindle;

a driven worm meshed with an external feature of the threaded nut; and a drive unit for providing a rotational drive movement, wherein the extension is positioned in the receptacle, and wherein the combination is operatively configured so that the rotational drive movement is transformed into a translatory movement of the upper rail relative to the lower rail, whereby the combination is a longitudinal adjuster for the vehicle seat.

* * * * *